US009118762B2

(12) United States Patent
Zyarko et al.

(10) Patent No.: US 9,118,762 B2
(45) Date of Patent: *Aug. 25, 2015

(54) SYSTEM AND METHODS FOR SELECTING A DIALING STRATEGY FOR PLACING AN OUTBOUND CALL (71) Applicant: Genesys Telecommunications Laboratories, Inc., Daly City, CA (US)

(72) Inventors: Vadim Zyarko, Walnut Creek, CA (US); Stanislav Zgardovski, Concord, CA (US); Oleksiy Kolomoyskyy, Moraga, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,646

(22) Filed: Jan. 22, 2014

(65) Prior Publication Data

US 2014/0233721 A1 Aug. 21, 2014

Related U.S. Application Data

(63) Continuation of application No. 12/621,790, filed on Nov. 19, 2009, now Pat. No. 8,660,258.

(51) Int. Cl.
*H04M 3/523* (2006.01)
*H04M 3/51* (2006.01)

(52) U.S. Cl.
CPC ................................. *H04M 3/5158* (2013.01)

(58) Field of Classification Search
CPC ..................................................... H04M 3/5158
USPC ........................................ 379/266.07, 266.08
See application file for complete search history.

(56) References Cited

U.S. PATENT DOCUMENTS

| 5,343,518 | A | 8/1994 | Kneipp |
| 5,594,790 | A | 1/1997 | Curreri et al. |
| 6,751,310 | B1 | 6/2004 | Crossley |
| 8,660,258 | B2 * | 2/2014 | Zyarko et al. ............ 379/266.07 |
| 2004/0109557 | A1 | 6/2004 | Lenard |
| 2011/0116618 | A1 | 5/2011 | Zyarko et al. |

* cited by examiner

*Primary Examiner* — Harry S Hong
(74) *Attorney, Agent, or Firm* — Christie, Parker & Hale, LLP (57) ABSTRACT

A dialing strategy determination engine (DSDE) for selecting a dialing strategy for placing an outbound call has determination software executing on a computerized server from a machine-readable medium, access to stored dialing strategies, contact data, and a rules set, and a port for receiving a request for dialing strategy from an outbound dialer. The determination software, upon receiving a request for a dialing strategy associated with a contact identification, consults the rule set and the contact data, selects a dialing strategy based on the rules and the data, and returns the selected strategy to the outbound dialer.

13 Claims, 9 Drawing Sheets

SYSTEM AND METHODS FOR SELECTING A DIALING STRATEGY FOR PLACING AN OUTBOUND CALL

CROSS-REFERENCE TO RELATED APPLICATIONS

This application is a continuation of U.S. application Ser. No. 12/621,790, filed on Nov. 19, 2009, the content of which is incorporated herein by reference.

BACKGROUND OF THE INVENTION

1. Field of the Invention

The present invention is in the field of computer telephony integration (CTI) systems, and pertains particularly to methods and apparatus for selecting a dialing strategy for placing an outbound call.

2. Discussion of the State of the Art

In the art of CTI telephony, contact centers are leveraged by enterprises to provide services like sales, customer service, and the like to enterprise customers who may call into the contact center to receive such services. Most contact centers employ agents to work live interactions and to perform other communications-oriented tasks. Incoming calls are typically intercepted by an interactive voice response (IVR) unit and are routed internally according to nature of and intent of the call.

Agents may be organized into agent groups having differing skill sets or departments and calls are routed to these agents based on availability, among other factors that might come into play. Agents typically operate a computer connected to a local area network (LAN) and an agent telephone when answering live voice interactions.

Contact centers often employ proactive tactics to provide business revenue and to fully employ agent employees. One of these tactics is an outbound calling campaign. An outbound calling campaign makes use of contact information known to or otherwise made available to the contact center for the purposes of automatically dialing out to individual contacts, and if calls are answered, connecting the calls to agents to accomplish a purpose of the campaign, such as sales. Such a calling campaign often employs an automated dialing system that dials numbers from a list of contact records or calling list.

One drawback with standard outbound calling campaigns is that campaign settings established, such as dialing strategy, dialing application, and other settings are configured at campaign level and affect every outbound call made during a same campaign. In order to treat contacts differently using different dialing strategies, dialing modes, and other settings, the contacts have to be sorted accordingly for multiple campaigns where the settings are different for each different campaign. The campaign level settings still apply to all outbound calls made under that campaign.

Therefore, what is clearly needed is a system and methods for selecting dialing strategies and other campaign settings on a call-by-call basis. A system such as this would provide flexibility to exploit different attributes of different contacts, where such exploitation may increase probability of successful call resolution and potentially increase campaign revenues.

SUMMARY OF THE INVENTION

A problem stated above is that more flexibility in the approach to dialing strategy determination is desirable in an active outbound calling campaign, but many of the conventional means for allowing flexibility in dialing application and dialing strategy choices etc. are bound to the entire campaign and effect every outbound call of a same campaign. The inventors therefore considered functional components of a computer telephony integrated (CTI) telephone system, looking for elements that exhibit real time use attributes that could potentially be harnessed to provide the flexibility for enabling different dialing strategies and application choices for individual calls placed during a calling campaign but in a manner that would not create complexity or tax the efficiency of the calling campaign.

Most outbound calling campaigns are facilitated by automated internal telephony dialing applications or hardware, interactive voice response (IVR) screening for callers that answer the outbound calls, and a routing system for routing the answered calls to appropriate destinations. A byproduct of an inflexible system is a higher ratio of the number of calls that fail to reach a live agent for call resolution. Most such outbound campaigns employ some form of number dialing apparatus with call progress detection and voice interception features and a router to facilitate the outbound campaign, and number dialers, IVR units and routing systems are typically a part of such apparatus.

The present inventor realized in an inventive moment that if, during an outbound calling campaign outbound calls of the same campaign could be treaded individually with respect to dialing strategy and dialing application selection, significant reduction in failed calls might result. The inventor therefore constructed a unique pre-dialing contact record analyzer and strategy determination engine for outbound calling campaigns that allowed individual calls of the same campaign to be treated individually while maintaining service level objectives of the campaign. A significant reduction in failed calls results, with no impediment to efficiency of the routing system created.

Accordingly, in one embodiment of the present invention, a dialing strategy determination engine (DSDE) is provided for selecting a dialing strategy for placing an outbound call, and has a determination software executing on a computerized server from a machine-readable medium, access to stored dialing strategies, contact data, and a rules set, and a port for receiving a request for dialing strategy from an outbound dialer. The determination software, upon receiving a request for a dialing strategy associated with a contact identification, consults the rule set and the contact data, selects a dialing strategy based on the rules and the data, and returns the selected strategy to the outbound dialer.

In one embodiment the contact data includes a customer value ranking, and dialing strategy selection is determined primarily by the customer value ranking. Also in one embodiment the dialing strategy is selected only after consulting a do-not-call list, and determining to dial or not to dial. Further in an embodiment the dialing strategy is selected based on a probability of sale value measured against a threshold. The contact data may include a preference for routing destination in an event of a call being answered.

In another embodiment of the present invention an outbound dialing system (ODS) is provided, comprising dialing software executing on a computerized server from a machine-readable medium, a dialing strategy determination engine (DSDE) coupled to the dialing software and enabled for selecting a dialing strategy for placing an outbound call, and a data repository comprising stored dialing strategies, contact data, and a rules set. The outbound dialing system, for each call to be dialed, first consults the DSDE, which consults the rule set and the contact data, selects a dialing strategy based on the rules and the data, and returns the selected strategy to the outbound dialing system.

In one embodiment the contact data includes a customer value ranking, and dialing strategy selection is determined primarily by the customer value ranking. Also in one embodiment the dialing strategy is selected only after consulting a do-not-call list, and determining to dial or not to dial. In yet another embodiment the dialing strategy is selected based on a probability of sale value measured against a threshold. The contact data may include a preference for routing destination in an event of a call being answered.

In another aspect of the invention a method for selecting a dialing strategy is provided, the method comprising the steps of (a) receiving a request for dialing strategy from an outbound dialer, together with a contact identification, by a dialing strategy determination engine (DSDE) executing on a computerized server from a machine-readable medium; (b) consulting a rule set and contact data stored in a data repository accessible by the DSDE, the contact data associated with the contact identification; (c) selecting a dialing strategy based on the contact data and the rule set; and (d) returning the selected dialing strategy to the outbound dialer.

In an embodiment of the method the contact data includes a customer value ranking, and dialing strategy selection is determined primarily by the customer value ranking. Also in an embodiment the dialing strategy is selected only after consulting a do-not-call list, and determining to dial or not to dial. In yet another embodiment the dialing strategy is selected based on a probability of sale value measured against a threshold. The contact data may include a preference for routing destination in an event of a call being answered.

In yet another aspect of the invention a method for outbound dialing is provided, comprising the steps of (a) upon selecting a contact to dial by an outbound dialer executing on a computerized server from a machine-readable medium, sending a request for a dialing strategy and an ID of the contact to a dialing strategy determination engine (DSDE); (b) consulting contact data and a rules set stored in a data repository by the DSDE, the contact data associated with the contact to dial; (c) selecting a dialing strategy by the DSDE based on the contact data and the rules set; (d) returning the dialing strategy selected to the outbound dialer; and (e) employing the selected strategy in dialing or not dialing the contact.

In one embodiment the contact data includes a customer value ranking, and dialing strategy selection is determined primarily by the customer value ranking. Also in one embodiment the dialing strategy is selected only after consulting a do-not-call list, and determining to dial or not to dial. In yet another embodiment the dialing strategy is selected based on a probability of sale value measured against a threshold. The contact data may include a preference for routing destination in an event of a call being answered.

DETAILED DESCRIPTION

The inventors provide a mechanism for selecting specific dialing strategy for dialing individual telephone numbers of individual contacts from a calling list used in an outbound calling campaign hosted by a contact center. The present invention is described in enabling detail using the following examples which may represent more than one embodiment of the present invention.

Figure 1:
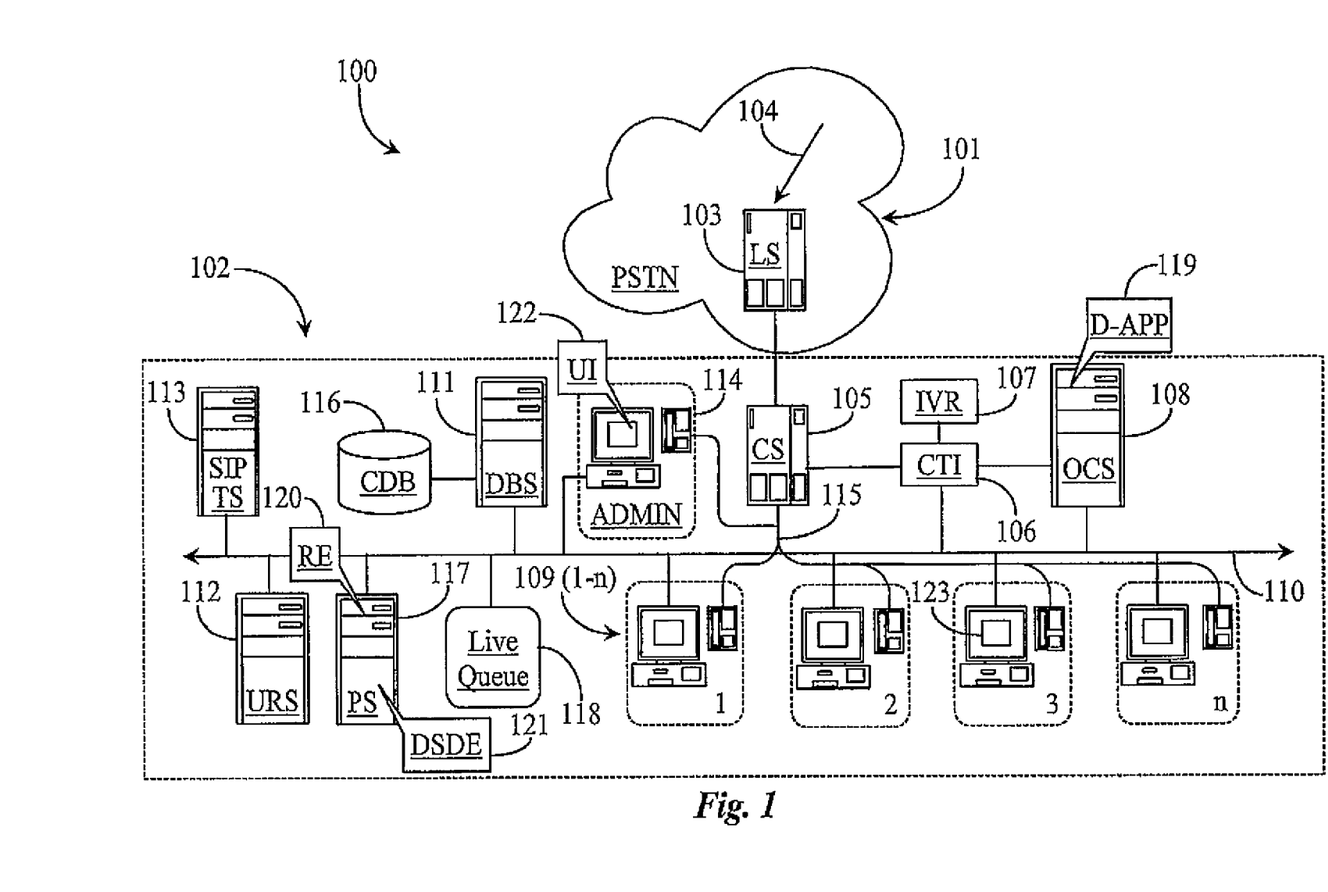
FIG. 1 is an architectural view of a contact center engaged in an outbound calling campaign according to an embodiment of the present invention.

FIG. 1 is an architectural view of a contact center 102 engaged in an outbound calling campaign according to an embodiment of the present invention. A communications network 100 is illustrated in this example and includes contact center 102 and the well-known public switched telephone network (PSTN) 101. Communication network 100 may also include the Internet network and any digital telephone carrier networks wired or wireless. The illustration of PSTN 101 is deemed sufficient for illustrating a telephone network from which incoming calls illustrated herein as calls 104 may arrive at contact center 102 for routing and through which contact center 102 may reach contacts by outbound dialing during an outbound calling campaign.

A local telephone switch (LS) 103 is illustrated within PSTN 101 and may be an automated call distributor (ACD), a private branch exchange (PBX) or some other type of telephone switching facility. LS 103 is connected to a central switch (CS) 105 provided within contact center 102. CS 105 may be an ACD or PBX or some other type of telephone switch. CS 105 may be a hardware switching facility or a soft switch (implemented in software) without departing from the spirit and scope of the present invention.

Contact center 102 includes a local area network (LAN) 110 that supports contact center equipment (CCE) including a computer telephony integrated (CTI) processor 106 that is connected to CS 105 by way of a CTI link. CTI processor 106 provides call processing intelligence to CS 105. CTI processor 106 supports an instance of interactive voice response (IVR) 107 for enabling customers of center 102 to engage automated self services as well as selective routing options based on customer response to IVR prompts.

Contact center 102 includes a number of agent stations 109 (1-n) supported by LAN 110. Each agent station 109 (1-n) includes a LAN-connected computing appliance and a telephone. Agent stations 109 (1-n) are manned by live agents trained to take customer calls, handle transactions, and to resolve customer issues. In this example, each telephone in each agent station 109 (1-n) is connected to CS 105 by internal telephony wiring 115. Inbound telephone calls represented by arrow 104 coming into LS 103 may be routed to CS 105 for internal routing within center 102.

LAN 110 supports an outbound contact server (OCS) 108. OCS 108 is adapted by digital medium and software to perform automated outbound number dialing to contacts from a calling list of contact numbers. OCS is used to place the telephone calls of an outbound calling campaign. OCS 108 has connection to CS 105 through CTI processor 106. OCS 108 has at least one automated dialing application 119 installed thereon and an automated telephone number dialer (dialer not illustrated). In this example, agents operating agent stations 109 (1-n) answer connected outbound calls along with normal inbound telephone traffic seeking live assistance. In one embodiment an outbound dialing system (ODS), has dialing software executing on a computerized server from a machine-readable medium; a dialing strategy determination engine (DSDE) coupled to the dialing software and enabled for selecting a dialing strategy for placing an outbound call; and a data repository comprising stored dialing strategies, contact data, and a rules set. The outbound dialing system, for each call to be dialed, first consults the DSDE, which consults the rule set and the contact data, selects a dialing strategy based on the rules and the data, and returns the selected strategy to the outbound dialing system.

LAN 110 supports a database server (DBS) 111 coupled to a digital storage media 116 that serves as a customer database (CDB) in this example. DBS 111 is adapted to serve customer data including contact records and any other pertinent customer data like purchase history, call history, address information, contact data, etc. on request from any requesting system having connection to LAN 110. DBS 111 is adapted to serve data upon request and to serve data to any other LAN-connected system or station upon command or notification from any other LAN-connected system or station that is authorized to notify the server to send specific data to a specific destination.

LAN 110 supports at least one administrator station (ADMIN) 114. ADMIN station 114 includes a LAN-connected computing appliance and a telephone. An authorized knowledge worker or administrator operating ADMIN station 114 may create business rules, and campaign settings relative to outbound calling Campaigns leveraging a user interface (UI) 122 provided as a software implement on the computing appliance of the station. LAN 110 supports an interaction queue 118 for queuing inbound interactions for agents working from agent stations 109 (1-n). Queue 118 may be a multimedia queue connected to a contact server adapted to represent queued interaction events of multiple media types. Live queue 118 is adapted in this example to queue interactions seeking live assistance including normal inbound traffic and outbound calls routed as inbound interactions to agents. In one embodiment live queue 118 may be dedicated for queuing connected outbound calls for live agents at stations 109 (1-n), which may also be dedicated to answering interactions resulting from outbound contact. Queue 118 is represented logically herein and may be hosted by a server such as a contact server.

LAN 110 supports a processing server (PS) 117. Processing server (PS) 117 is a data processing and result server coupled to a digital medium hosting software and data to enable server function. PS 117 is adapted, with the aid of a dialing strategy determination engine (DSDE) 121 implemented in software, to select an appropriate dialing strategy to implement at OCS 108 concerning whether to and how to dial a contact from a calling list. PS 117 processes requests for dialing strategies received from OCS 108 per contact dialed during an outbound campaign. The dialing strategies are elected based on contact records and customer data weighed against business rules for operating specific campaigns. PS 117 has a rules engine (RE) 120 implemented in software. RE 120 applies business rules to help determine a best dialing strategy for dialing out to a contact from a current calling list used during the particular outbound campaign.

In one embodiment the dialing DSDE is for selecting a dialing strategy for placing an outbound call, and has determination software executing on a computerized server from a machine-readable medium; access to stored dialing strategies, contact data, and a rules set; and a port for receiving a request for dialing strategy from an outbound dialer. In this embodiment the determination software, upon receiving a request for a dialing strategy associated with a contact identification, consults the rule set and the contact data, selects a dialing strategy based on the rules and the data, and returns the selected strategy to the outbound dialer.

LAN 110 supports a universal routing server (URS) 112 that is coupled to a digital medium adapted to contain the data and software required to enable server function. URS 112 provides routing instruction for routing normal incoming calls and may also provide routing instruction for routing connected outbound interactions as incoming interactions within center 102. URS 112 is a multimedia routing server adapted to provide routing intelligence for multiple types of interactions including voice interactions. LAN 110 also supports a session initiation protocol (SIP)-enabled transaction server SIP/TS 113 for enabling SIP-based interaction processing.

A dialing application (D-APP) 119 is installed on and executable from a digital medium coupled to OCS 108 and serves to enable automated outbound dialing to contacts whose telephone numbers are taken from a calling list (not illustrated) that may be assembled for the particular campaign. D-APP 119 may include a number of different dialers and modes for dialing that may be pre-selected for a specific campaign and include call progress detection (CPD) settings such as busy detection and answer detection and whether or not the telephone is answered by a human or a machine. Dialing parameters are also pre-set for a campaign and numbers from the record of contacts assembled for a calling list used in a campaign typically all are subject to the same dialing parameters and are subject to the same set of parameters generic to the campaign.

In contrast to the above, DSDE 121 allows specific dialing application parameters to be selected call-by-call. In this way contact numbers dialed in a same campaign may have widely divergent characteristics like different area codes, country codes, number types, such as land line, Skype™, cellular telephone, etc. In use of the present invention, OCS 108 obtains contact records for each contact to be dialed during a particular outbound campaign.

A complete contact record may include one or more contact numbers and a priority indication as to which of more than one number is a priority number or a first number to try. Contact name, address, region, area code, time zone, and other attributes may be included in a contact record for a single contact. In one embodiment contact records may further include calling history including call results relative to previous telephone contacts whether the contact called into the center or was subject to another or earlier outbound campaign.

In one embodiment, for each contact in a calling list, OCS 108 generates and sends a pre-dialing strategy request to PS 117 running DSDE 121 and RE 120. Along with the request, the contact record for the contact subject to a dialing is forwarded to PS 117 and is parsed by DSDE 121. In one embodiment, additional external information about the contact may be forwarded to PS 117 from OCS 108 or from another server like DBS 111, upon sending a notification to the server from OCS 108, to forward data about the contact. Such data may include purchase history, customer rank (platinum, gold, silver), complaint history, etc. A contact record may also include any contact preferences like times to call, priority numbers to call, and even an indication of whom the contact prefers to do business with at the center such as a special department or agent that the contact approves of or implicitly trusts.

PS 117 parses the information received including the contact record and any other external data available and runs one or more algorithms involving RE 120 to determine a best dialing strategy from multiple dialing strategies for the specific call. The selected dialing strategy may specify several parameters including dialing parameters, which dialer and dialing mode is best for the call. Rules may be created by administrative personnel for contacts that might be dialed during any type of outbound campaigns. One simple business rule might be that any contact who has called the center or who was called by the center within the past week should not be dialed. Another business rule might be if a contact is a valued customer ranking higher than average, then the contact should be dialed manually (preview) to ensure that a live agent is available to handle the call. Many different types of business rules applying to outbound calling campaigns can be created and applied to help determine dialing strategy for contacts listed for outbound calling.

Once a dialing strategy is selected or determined by DSDE 121, the strategy is returned to OCS 108 where it is parsed and leveraged as the strategy to use for dialing the associated contact. In this way an outbound dialing campaign has much more flexibility and can include many more diverse contact records. For example, a land line contact may be dialed followed by a Skype™ contact, and so on. Contacts having different dialing codes may be called during the same campaign. Better decisions about whether to dial a contact number or not can be made based on external intelligence about the contact in question. For example, if a contact was not dialed or has not called in within the last week (rule) the strategy may still be a "do not dial" strategy if the contact has just launched a complaint process against the center (rule).

Figure 2:
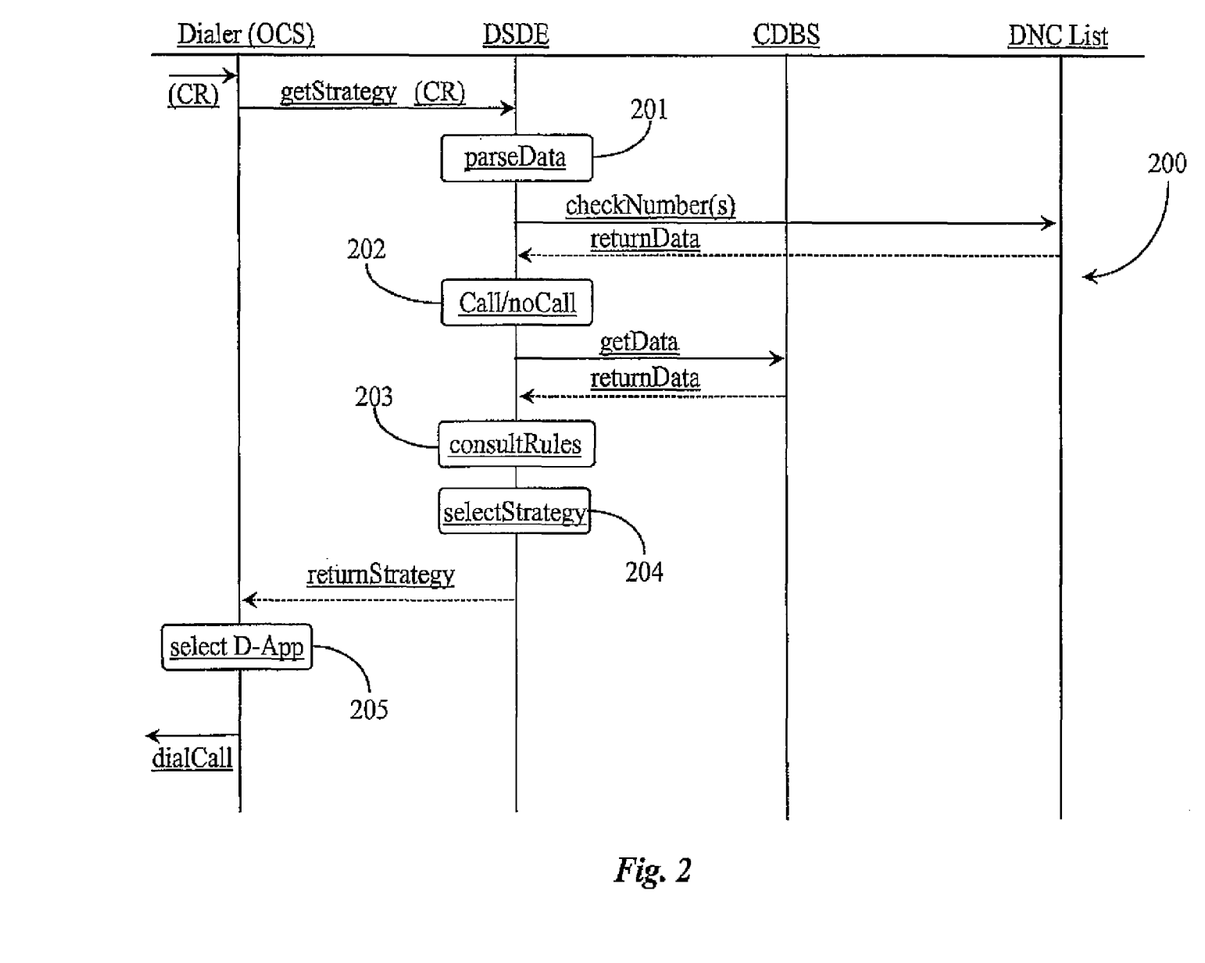
FIG. 2 is an interaction flow chart illustrating interaction between components of an outbound calling system according to an embodiment of the present invention.

FIG. 2 is an interaction flow chart illustrating interaction between components of an outbound calling system according to an embodiment of the present invention. Interaction flow 200 begins with the OCS or dialer receiving a contact record to dial. Instead of arbitrarily dialing the contact number, the OCS issues a request (getStrategy) to the processing server running the DSDE and sends the complete contact record (CR) along with the request. The DSDE parses the data (parseData) in task 201. As an initial step in processing, the DSDE may check the number or numbers (checkNumber(s)) of the contact record against a do not call (DNC) list. A data server may return the result (returnData) to DSDE and the DSDE can make a call or no call decision (Call/noCall) in task 202 based on the returned result.

If the contact is not on the national "do not call" list the DSDE may request (getData) from any external data held about the contact of record. In this case the processing server running DSDE may request the data from a contact database server (CDBS). In another embodiment, any external data may be forwarded to the processing server and DSDE for the contact along with the contact record, or in another case it may arrive separately from one or more servers upon notification sent to those servers requesting the data transfer(s). In this case such a notification may be sent to one or more of the data sources by the OCS when it sends the CR to the processing server running the DSDE. After the results are returned (returnData) to DSDE, the determination engine may consult (consultRules) the rules engine in task 203 during which one or more than one algorithm may be run using contact data as input against the weight of the rules resulting in a selection of strategy (selectStrategy) in task 204.

Once the dialing strategy is determined for the contact record by DSDE, the processing server returns the strategy (returnStrategy) to the OCS. The OCS then selects the dialing application (selectD-App) in task 205. The dialing application selected will include the dialer to use and the mode of dialing. The OCS then dials the call (dialCall) using the appropriate strategy and dialing mode. CPD settings may also be attached to different dialing applications so that the appropriate CPD settings are put in play according to the dialing strategy selected. For example, the CPD settings for a land line may be different from those of a Skype™ connection.

Figure 3:
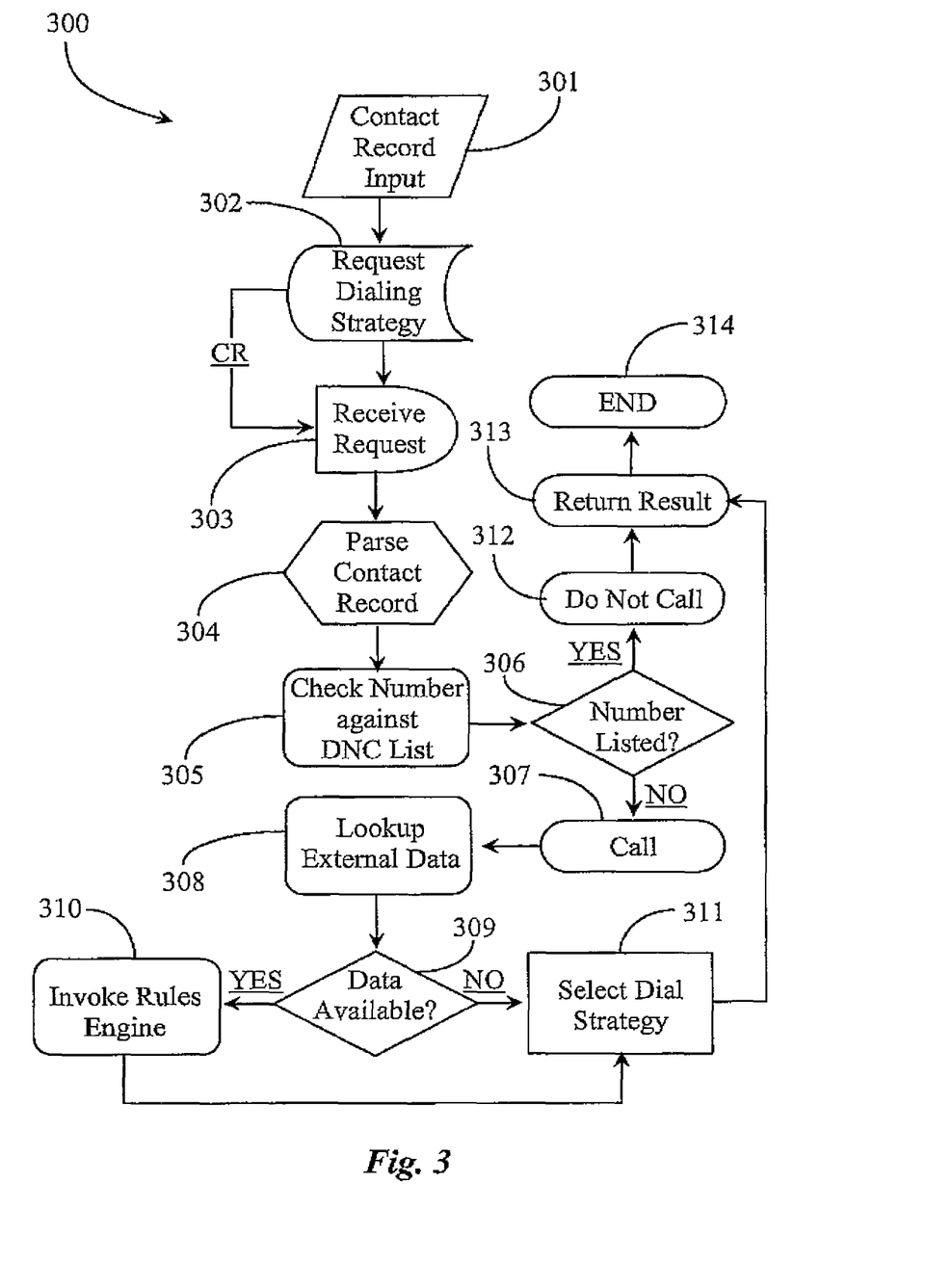
FIG. 3 is a process flow chart illustrating steps for selecting a dialing strategy for an outbound call according to an embodiment of the present invention.

FIG. 3 is a process flow chart illustrating steps 300 for selecting a dialing strategy for an outbound call according to an embodiment of the present invention. At step 301 an OCS analogous to OCS 108 of FIG. 1 accepts a contact record as input. The OCS requests a dialing strategy decision from a processing server analogous to PS 117 running an instance of DSDE 121 of FIG. 1 at step 302. At step 303 the request is received along with at least the complete contact record (CR).

At step 304 the DSDE parses the contact record and at step 305 the DSDE checks the priority call number against a DNC list. At step 306, if the number is listed then DSDE makes a decision not to call at step 312 and the do not call strategy is returned to the OCS at step 313 and the process ends for that contact record at step 314. If the contact record contains more than one contact number, the DSDE may check all of the numbers against a do not call list before making a do not call determination. If one of those checked numbers is not on the list then a decision to call would be made at step 307, which is also true if there is only one contact number that is not listed.

Before selecting a dialing strategy, the system may look up external data about the contact at step 308. It is noted herein that any external data may be pre-gathered by the OCS and forwarded with the contact record at step 302, or a notification may be sent at step 302 to a data host server that would forward any external data about the contact to the DSDE at the time the CR is received. Referring now back to step 307, a decision to call may be followed by a lookup of external data at step 308. If there is no available data other than the contact record at step 309 the system may arbitrarily select a dialing strategy based solely on the contact record at step 311. The process then resolves to step 313 where the dialing strategy is returned to the OCS and the process ends for that contact record at step 314.

If it is determined at step 309 there is external data available about the contact of record, the DSDE may invoke a rules engine at step 310. The rules engine applies current business rules relative to the campaign to certain data known about the contact of record such as whether the contact is ranked platinum, gold, or silver, whether the client has lodged one or more recent complaints, whether the client currently owns a version of the product or service offered, etc. At step 311 the DSDE selects a dialing strategy based on runtime algorithmic analysis of the available data. The dialing strategy selected at step 211 is returned to the OCS at step 313 as previously described and the process ends for that contact record.

In one embodiment, it is possible that a call decision is made at step 307 followed by selection of a do not call strategy for the contact record at step 311. This might be based on something in the external data such as the customer had already been called by the center less than on week prior. This fact located in the external data or in the call record would trigger the rule that prevents the center from contacting client. In this case a no dial strategy is returned at step 313 and the OCS skips the call moving to the next contact record.

Figure 4:
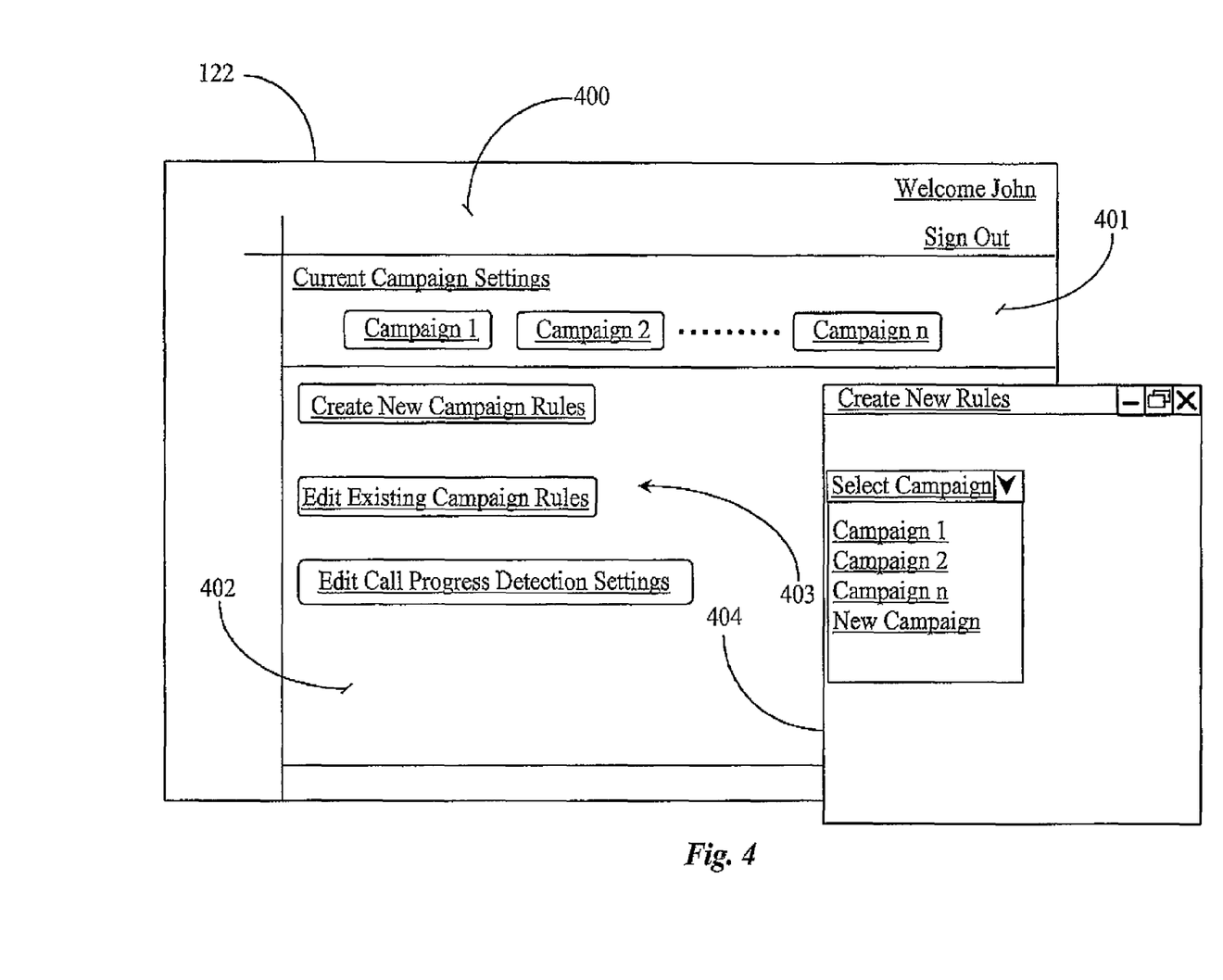
FIG. 4 is an exemplary user interface for accessing campaign settings and configuring campaign rules according to an embodiment of the present invention.

FIG. 4 is an exemplary user interface 122 for accessing campaign settings and configuring campaign rules according to an embodiment of the present invention. User Interface (UI) 122 is provided to the computing appliance of an agent, administrator or some other authorized user as a browser-based interface. In another embodiment, it may be a standalone application or it may be a server-based application accessed by the agent or knowledge worker.

UI 122 has a title bar 400 that contains all of the typical browser-based settings and options including one or more search interfaces and an address navigation bar. A first workspace window 401 contains all of the current campaign settings already established for current outbound campaigns which are listed as interactive options Campaign 1, Campaign 2, to Campaign n. Selecting a campaign button opens the campaign settings interface (not illustrated) for view and editing.

A second workspace window 402 contains campaign configuration options 403 including an option for creating new campaign rules, an option for editing existing campaign rules, and an option for editing call progress detection settings. Selecting any of these options may invoke a third workspace window 404, in this case, a rules creating interface. A drop-down menu in the window enables a user to select any existing campaign to create new rules for, or the user may select new campaign to build a new outbound calling campaign. Additional campaign configuration options may be provided in this example without departing from the spirit and scope of the present invention. The inventor intends that UI 122 and subsequent workspace windows are exemplary only wherein such options may be presented in many other ways.

Figure 5:
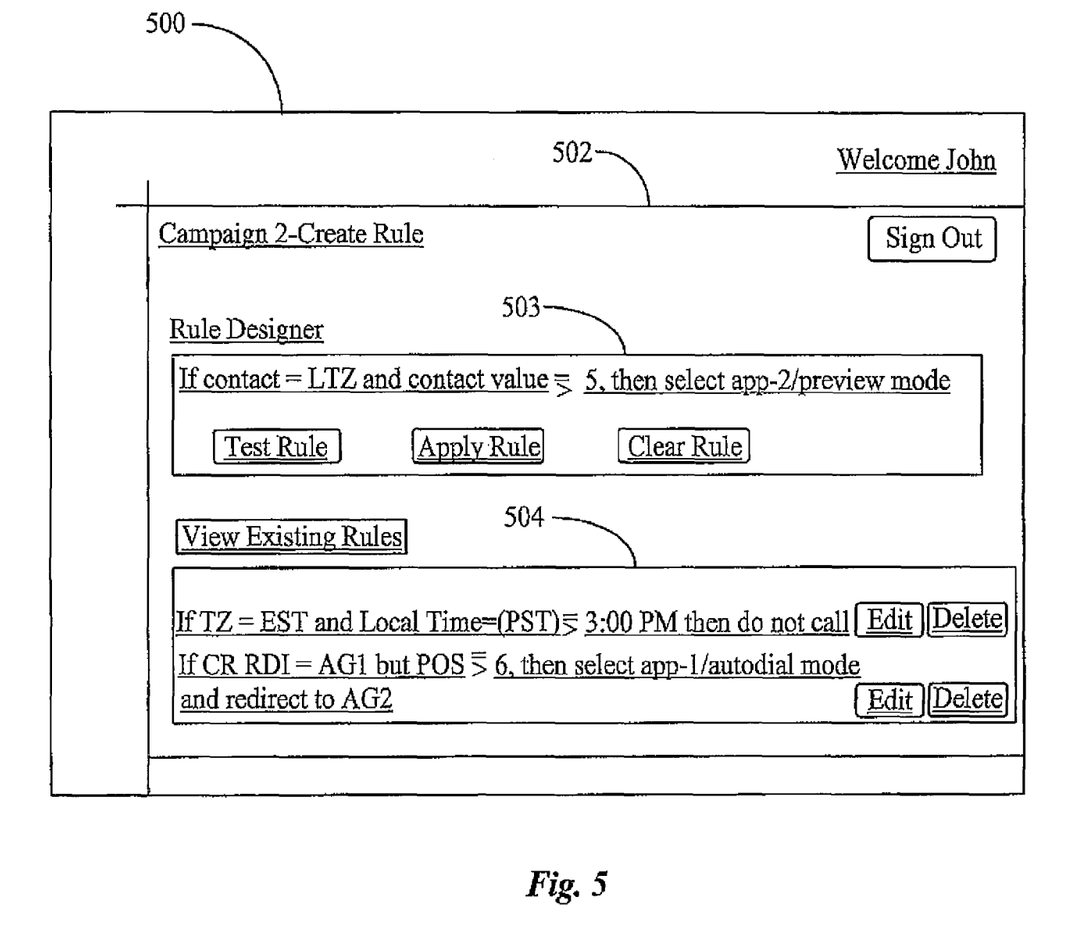
FIG. 5 is an exemplary interface for designing and editing strategy selection rules according to an embodiment of the present invention.

FIG. 5 is an exemplary interface 500 for designing and editing strategy selection rules according to an embodiment of the present invention. Interface 500 may appear if a user selects create new rules and then chooses a campaign the rules will apply to. In this case interface 500 is an extension of user interface 122 and is personalized to the user John. A workspace window 503 contains a rule designer dialog box 503 and a workspace window 504 contains a dialog box for viewing or listing existing rules for campaign 2. Campaign 2 was selected from the drop-down menu in window 404 of UI 122 of FIG. 4. Interface 500 has a sign out option. In one embodiment personnel who are authorized to make or edit rules and campaign settings must log-into the interface and be authenticated as authorized users before proceeding to make any changes.

In rule designer window 503 a rule might state if the contact is in a local time zone (LTZ) and the value or ranking of the contact is 5 or more, then select dialing application 2/preview mode. Preview mode is a mode that requires an agent to be available to place the call. In preview mode, the selected agent receives the contact record and data about the call and caller ahead of the dial. In this way, highly valuable customers may be contacted directly by a live agent. Options may be provided for testing a new rule in simulation, applying the new rule to the rule set governing a campaign, and clearing the rule.

In viewing window 504, existing rules are listed. The first rule states that if the time zone (TZ) of the contact of record is Eastern Standard Time (EST) and local time is Pacific Standard Time (PST) and the local time is equal to or greater than 3:00 PM, then do not call the contact. In this case the contact is not called even though the contact number is not on a do not call list. A next rule states that if a routing destination indicator (RDI) in the contact record (CR) is equal to agent group 1 (AG 1) but the probability of sale (POS) value is 6 or greater, then select dialing application 1 (app-1) autodial mode and redirect the call if answered to agent group 2 (AG 2). Each rule listed has an option for editing and an option for deleting the rule from the rules set. Rules may be expressed differently using variant forms of machine readable language without departing from the spirit and scope of the present invention.

Figure 6:
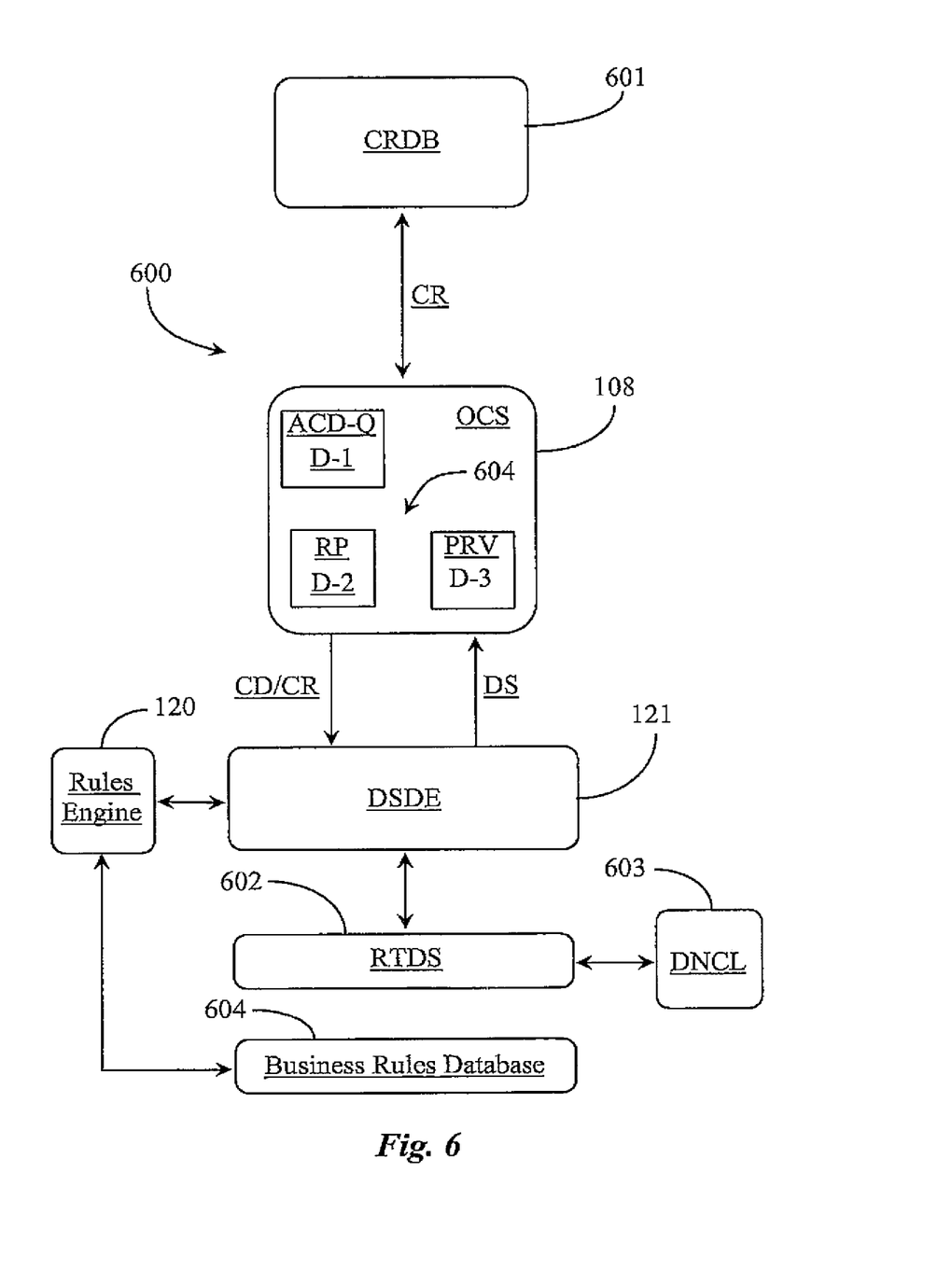
FIG. 6 is a block diagram illustrating components of an outbound calling system according to another embodiment of the present invention.

FIG. 6 is a block diagram illustrating components of an outbound calling system 600 according to another embodiment of the present invention. System 600 includes OCS 108. OCS 108 has connection to a contact record database (CRDB) 601 and receives contact records relevant to the current outbound campaign running. Before dialing out OCS 108 requests a dialing strategy decision from DSDE 121. DSDE 121 may be hosted on a processing server or a processor having suitable power coupled with any computing appliance.

In this embodiment DSDE is connected to a runtime data server (RTDS) 602. RTDS 602 has a digital medium coupled thereto for storing the data and software required to enable server function. DSDE 121 also has connection to rules engine 120, which in turn is connected to a business rules database 604. RTDS 602 has connection to a do not call list (DNCL) 603. RTDS may be connected to a variety of additional data sources to enable it to provide runtime information from the plurality of sources to DSDE 121 upon request.

In this embodiment both contact records and associated customer data are delivered to OCS 108 during an outbound campaign. OCS 108 forwards all of this data on to DSDE 121 for processing in the form of a dialing strategy request sent to the DSDE host, most likely a processing server. When DSDE 121 receives all of the data attached to the request from OCS 108, it begins processing the requests. If needed DSDE 121 requests additional data from RTDS 602 such as current DNC listing and possibly other stats, values, or other relevant data that may be available in addition to the customer data and contact record data.

Once DSDE has all of the data it needs to process the request, it consults RE 120 connected to business rules database 604. RE 120 retrieves the current rules for the campaign being run and applies them one by one to the data received by DSDE 121. The application may involve the use of one or more algorithms to enable final determination of a dialing strategy. DSDE 121 selects the dialing strategy and returns the strategy to OCS 108. In this case OCS 108 may be instructed to select from a number of applications 604 including, a dialer 1 (D-1), which utilizes an automatic call distributor (ACD) queuing point; dialer 2 (D-2), which utilizes a routing point (RP); or a dialer 3 (D-3), which uses a preview mode where an available agent is dialed and instructed to place the outbound call personally. In the latter case all of the CR data is forwarded to the agent. In any case the dialer request sent by the OCS is accompanied by the dialing strategy data that will be applicable to how the call is dialed and what mode the dialer will proceed with.

Figure 7:
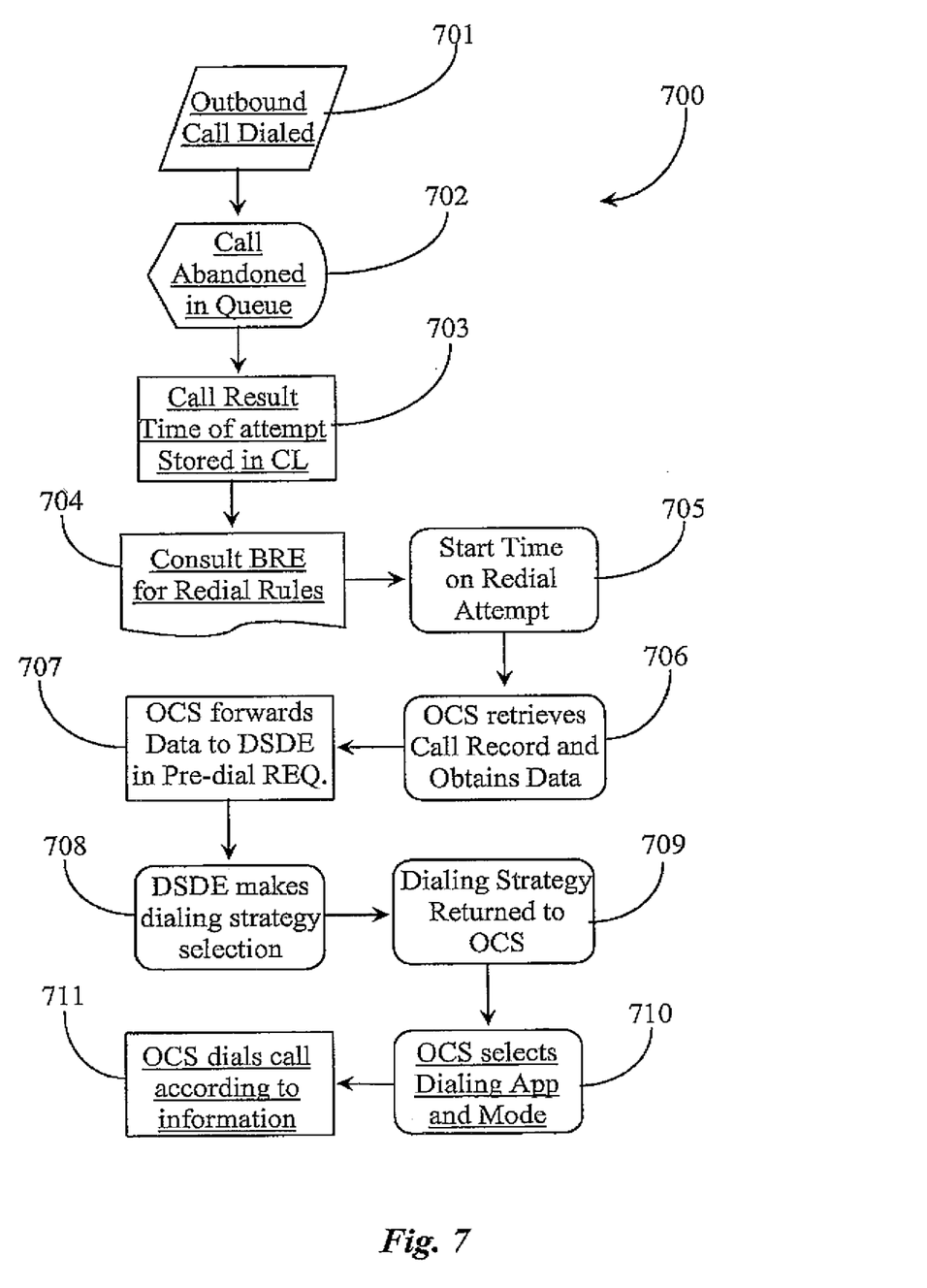
FIG. 7 is a process flow chart illustrating steps for selecting a dialing strategy based on previous outbound contact results according to an embodiment of the present invention.

FIG. 7 is a process flow chart illustrating steps 700 for selecting a dialing strategy based on previous outbound contact results according to an embodiment of the present invention. At step 701 an outbound contact server analogous to OCS 108 of FIG. 1 dials an outbound call from a contact record. At step 702, the call is answered but due to no available agent, the call is abandoned in queue. As a result of the call dropping out of queue, the call result (abandoned) and the time and date of the call attempt are recorded for that contact record. A business rules engine is consulted at step 704 to determine redial rules for the abandoned call. A time period is imposed before the OCS may redial the contact. At step 705 the time window is applied and the redial time window is started.

The OCS retrieves the contact record and customer data of the contact whose call dropped out of queue as part of normal continuing outbound calling campaign in progress at step 706. This step may occur during a later campaign targeting the same or similar calling list that includes the contact associated with the previous abandoned call. At step 707 the OCS forwards the contact record and customer data to the dialing strategy determination engine as part of a pre-dial strategy request.

At step 708 the DSDE makes a strategy selection based on the data known including the contact record and customer data. Sub steps to this step may include consulting with the rules engine. If the time window for not dialing associated with the contact record has not expired the DSDE will select a no-dial strategy and return the strategy to the OCS at step 709. If the DSDE determines that the time window for not dialing has expired at step 708 the DSDE will select an appropriate dialing strategy based on the contact record and other customer data if available. In either case the DSDE will return the dialing strategy to the OCS at step 709. The dialing strategy will contain specifics about which dialing application, dialer and mode to use to place the outbound call. At step 710 the OCS selects the dialing application and mode for the dial operation. At step 711 the OCS dials the contact according to the received information.

It is noted herein that if the no-dial time window is established via time stamp or some other indication in the calling record as described further above, and the window did not expire by the next time the contact record was retrieved for dialing then the DSDE would not have to consult the rules engine as the decision is indicated by the non-expiration of the time period. In one embodiment such an indication may prevent the contact record from becoming part of a calling list in a later campaign until the time constraint was lifted.

Figure 8:
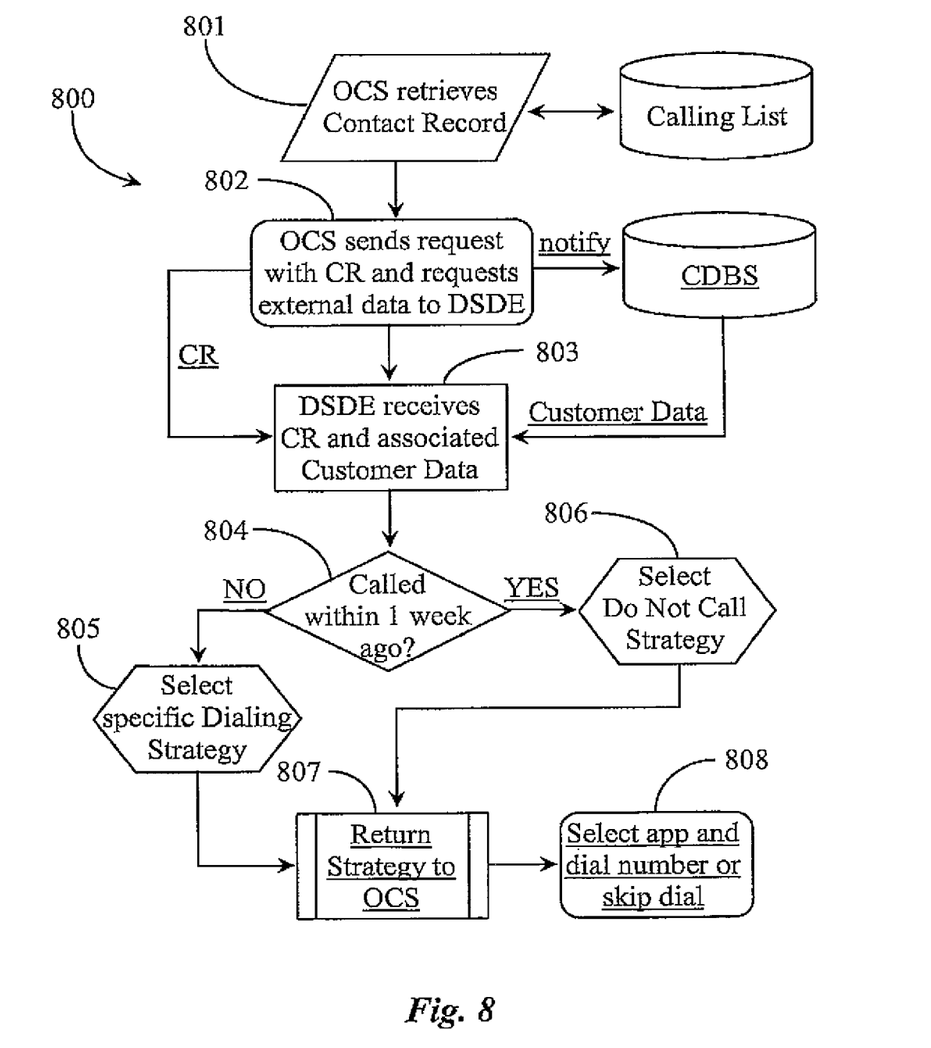
FIG. 8 is a process flow chart illustrating steps for selecting a dialing strategy based on previous call in history according to an embodiment of the present invention.

FIG. 8 is a process flow chart illustrating steps 800 for selecting a dialing strategy based on previous call-in history according to an embodiment of the present invention. At step 801 the OCS retrieves the contact record from a calling list associated with a current outbound campaign. In one aspect at step 802 the OCS sends a pre-dialing strategy request along with the contact record data to the DSDE. In this case, the OCS notifies a customer database server to forward any customer data relative to the customer identified in the contact record to the DSDE. In other variation, the OCS retrieves external customer data and sends it along with the contact record to the DSDE. In still another variation, the DSDE does its own data lookup after receiving a contact record and before consulting a rules engine to determine a dialing strategy.

At step 803 the DSDE receives the contact record and the associated customer data if any existed. In this case the DSDE checks to see what amount of time has passed since the customer identified in the contact record called into the contact center. A business rule associated with the current campaign states that if a customer has called into the center less within the last week (recorded in history data) then that customer should not be contacted.

At step 804 the DSDE in consultation with the rules engine determines first whether to dial or not to dial based on the call history of the contact. At step 804 if it is determined that the contact called into the center within the past week, a do-not-call dialing strategy is selected at step 806. At step 807 the dialing strategy is returned to the OCS and at step 808 the call is skipped or not dialed. At step 804 if it is determined that the contact has not called into the center within the last week then the DSDE makes a decision to call and in further consultation with the rules engine selects a specific dialing strategy for the call at step 805. The selected dialing strategy decision is returned to the OCS at step 807.

At step 808 the OCS selects the dialing application including dialer and mode and dials the contact. In one aspect of the process flow the DSDE may determine how much time has elapsed since the last call-in by the contact. This can be determined from information in the contact record if it is so updated. Hence no rules consultation is required until the call or no call matter is resolved. The rules are consulted between steps 805 and 807 in the case that a "call" decision was made at step 804.

Figure 9:
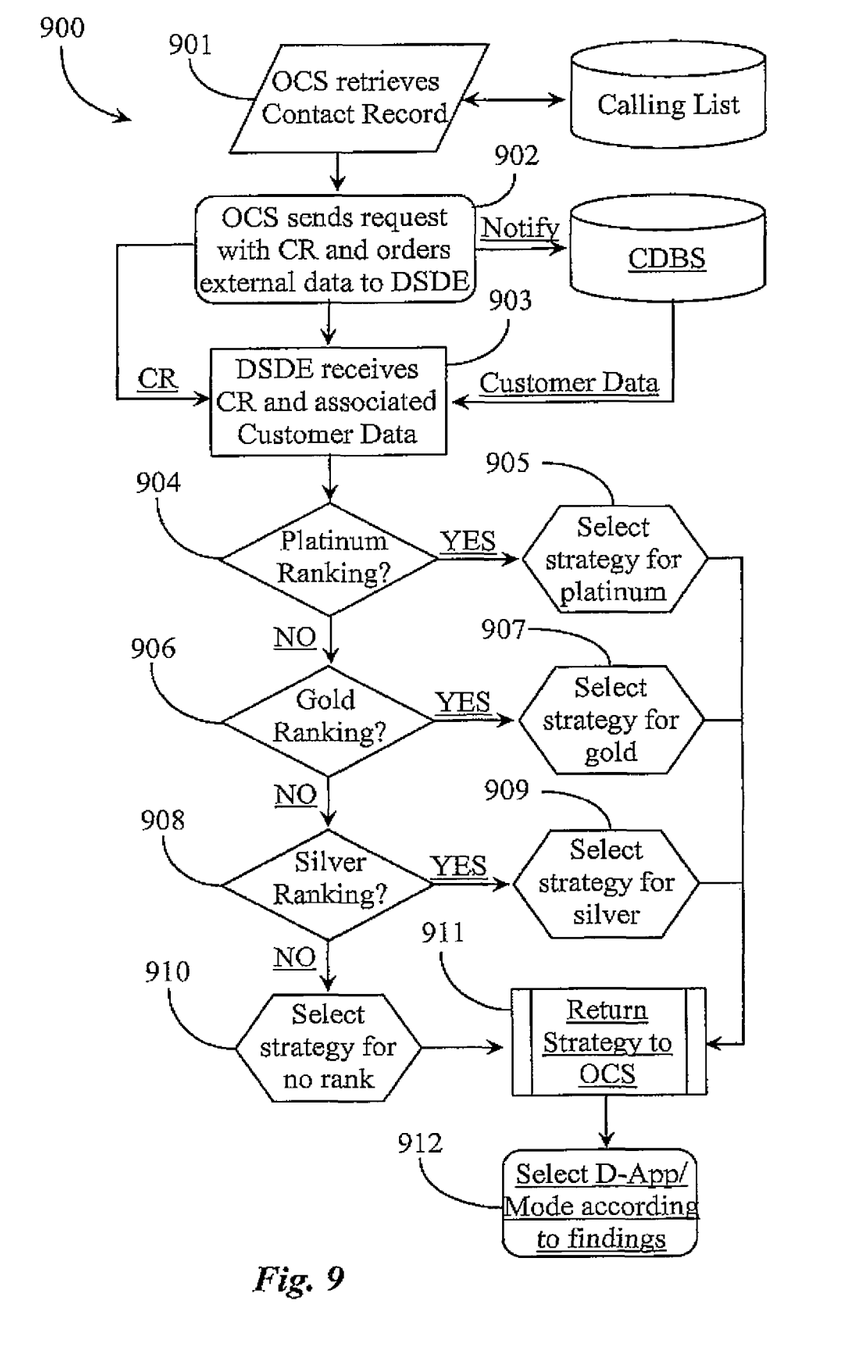
FIG. 9 is a process flow chart illustrating steps for selecting a dialing strategy based on current customer ranking according to an embodiment of the present invention.

FIG. 9 is a process flow chart illustrating steps 900 for selecting a dialing strategy based on current customer ranking according to an embodiment of the present invention. At step 901 the OCS retrieves a contact record as a normal process of the outbound campaign from a calling list associated with the campaign. The OCS sends a request for a dialing strategy along with the contact record data at step 902. At the same time the OCS may notify a customer database server (CDBS) to forward any external customer data associated with the contact to the DSDE for consideration. Other variations to this aspect exist as described further above.

At step 903 the DSDE receives the contact record data and the customer data available at the time. In this example dial strategy selection depends on whether a customer has ranking with the center and if so what ranking. In consultation with the rules engine and customer data, the DSDE determines at step 904 if the customer associated with the contact record is ranked as a platinum customer. If so then the DSDE selects the dialing strategy associated with platinum customers at step 905. The strategy is returned to the OCS at step 911 and the OCS selects the appropriate dialing application and mode accordingly at step 912.

If the customer is determined not to be a platinum customer at step 904, then at step 906 the DSDE determines if the customer associated with the contact record has a gold ranking. If the customer is determined to rank gold in step 906 the process moves to step 907 and the DSDE selects the appropriate dialing strategy for gold. The process then moves to steps 911 where the strategy is returned to the OCS and 912 where the OCS selects the dialing application and mode accordingly.

At step 906 if the DSDE determined that the customer associated with the contact is not a gold customer, then at step 908 the system determines if the customer associated with the contact record is ranked silver. If so then the DSDE selects the dialing strategy for silver customers at step 909 and the strategy is returned to the OCS at step 911. The OCS selects the dialing application and dialing mode at step 912. If the DSDE determines that the customer associated with the contact record is not a silver customer at step 908 then the DSDE selects the appropriate dialing strategy used for un-ranked customers at step 910. The strategy is returned to the OCS at step 911 and the OCS selects the appropriate dialing application and dialing mode at step 912.

In one aspect of this process the DSDE may first determine whether or not the customer is ranked, and if so may determine what rank by consulting the external ranking data. In some aspects more than one dialing strategy may be selected for a certain condition or state with one dialing strategy taking priority over the other. In such a case, current agent availability statistics or other states may determine if the priority strategy is abandoned for a secondary or backup strategy. For example, a platinum customer may command a dialing strategy that utilizes a preview mode where an available agent gets the customer data and contact record and manually dials the call. However, there may not be an agent available at the time to make the call, in which case a no-dial strategy or an auto-dial strategy with ACD queuing might be selected.

In one embodiment of the present invention contact records in a calling list for an outbound campaign may be pre-sorted according to priority so that the most important contacts are called at the most optimal time periods such as at times when there are numbers of agents with appropriate skill levels in the group available to take the calls. Lower priority contacts could be called during the times that fewer agents are predicted to be available.

It will be apparent to one with skill in the art that the dialing strategy selection system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for making outbound calls, the system comprising:
   a data storage device for storing information for a plurality of contacts in a calling list;
   one or more processors coupled to the telephony switch and the data storage device; and
   one or more memory devices coupled to the one or more processors and having instructions stored therein, the one or more processors each being configured to execute at least a portion of the instructions, the instructions comprising:
      identifying a contact from among the plurality of contacts in the calling list;
      receiving information about the contact from the data storage device;
      comparing at least a portion of the received information against a condition;
      determining, based on the comparing, that a call is to be made to the contact;
      in response to determining that a call is to be made, selecting a particular dialing strategy from among a plurality of dialing strategies appropriate for the contact, wherein the particular dialing strategy is selected based on a criterion; and
      dialing the contact according to the selected dialing strategy; and
   a telephony switch configured to make a connection between a telephony device of the contact, and a contact center resource, in response to the dialing.

2. The system of claim 1, wherein the information about the contact comprises a contact record, the contact record comprising at least one of a priority indication, a name, a region, or contact preferences.

3. The system of claim 2, wherein the information about the contact further comprises external data, the external data comprising at least one of a purchase history, a customer rank, or a complaint history.

4. The system of claim 3, wherein the instructions for selecting the dialing strategy includes instructions for consulting one or more business rules by running one or more algorithms using the information as input.

5. The system of claim 1, wherein the condition comprises a do not call list, and the instructions for determining that the call is to be made includes instructions for determining that a number associated with the contact is not included in the do not call list.

6. The system of claim 1, wherein the instructions further comprise retrieving external data about the contact, the external data comprising at least one of a purchase history, a customer rank, a calling history, or a complaint history.

7. The system of claim 1, wherein the selected dialing strategy specifies one or more parameters, the one or more parameters comprising at least one of a dialer type or a dialing mode.

8. The system of claim 1, wherein the at least a portion of the received information comprises a date and a time of an abandoned call result, and the condition comprises a time period before redial.

9. The system of claim 8, wherein the instructions for determining that the call is to be made includes instructions for determining that the time period before redial has expired.

10. The system of claim 1, wherein the at least a portion of the received information comprises a date and a time of a previous incoming call by the contact, and the condition comprises an elapsed time period since the previous incoming call.

11. The system of claim 10, wherein the instructions for determining that the call is to be made includes instructions for determining that the elapsed time period is greater than or equal to the threshold amount.

12. The system of claim 1, wherein the condition comprises a customer rank.

13. The system of claim 1, wherein the criterion comprises a priority value.

* * * * *